(12) United States Patent
Benton

(10) Patent No.: US 7,511,736 B2
(45) Date of Patent: *Mar. 31, 2009

(54) AUGMENTED REALITY NAVIGATION SYSTEM

(76) Inventor: Charles Benton, 372 Boothbay Rd., Edgecomb, ME (US) 04556

( * ) Notice: Subject to any disclaimer, the term of this patent is extended or adjusted under 35 U.S.C. 154(b) by 1340 days.

This patent is subject to a terminal disclaimer.

(21) Appl. No.: 10/453,767

(22) Filed: Jun. 3, 2003

(65) Prior Publication Data

US 2004/0179104 A1 Sep. 16, 2004

Related U.S. Application Data

(63) Continuation-in-part of application No. 10/385,119, filed on Mar. 10, 2003, now Pat. No. 7,071,970.

(51) Int. Cl.
*H04N 5/228* (2006.01)
*H04N 7/00* (2006.01)
*H04N 5/225* (2006.01)
*G03B 39/00* (2006.01)
*G01C 22/00* (2006.01)

(52) U.S. Cl. ............ 348/208.14; 348/113; 348/207.99; 396/13; 701/28

(58) Field of Classification Search ........................ None
See application file for complete search history.

(56) References Cited

U.S. PATENT DOCUMENTS

| | | | |
|---|---|---|---|
| 3,576,999 A | 5/1971 | Blyth | |
| 4,672,562 A | 6/1987 | Egli et al. | |
| 4,802,757 A | 2/1989 | Pleitner et al. | |
| 4,866,626 A | 9/1989 | Egli | |
| 4,896,145 A | 1/1990 | Lewkowicz | |
| 5,155,684 A | 10/1992 | Burke et al. | |
| 5,259,037 A * | 11/1993 | Plunk | 382/154 |
| 5,786,849 A * | 7/1998 | Lynde | 348/113 |
| 5,911,767 A | 6/1999 | Garibotto et al. | |
| 6,181,302 B1 | 1/2001 | Lynde | |
| 6,208,933 B1 | 3/2001 | Lazar | |
| 6,278,918 B1 | 8/2001 | Dickson et al. | |
| 6,285,930 B1 | 9/2001 | Dickson et al. | |
| 6,292,215 B1 * | 9/2001 | Vincent | 348/169 |
| 6,453,223 B1 | 9/2002 | Kelly et al. | |
| 6,466,259 B1 * | 10/2002 | Stanton | 348/148 |
| 7,071,970 B2 * | 7/2006 | Benton | 348/208.14 |
| 2002/0069013 A1 | 6/2002 | Naab et al. | |

* cited by examiner

*Primary Examiner*—Thai Tran
*Assistant Examiner*—Heather R Jones

(57) ABSTRACT

A navigation system utilizing augmented reality is provided which utilizes captured images to generate orientation information, wherein the pitch, yaw and roll are periodically derived from an inexpensive sensor, and in-between the periodical update, the pitch, roll, and yaw information are derived by capturing and image of the observed scene, identifying reference image components (RIC's) in a images and comparing those RIC's with subsequently captured images, to derive orientation information.

20 Claims, 3 Drawing Sheets

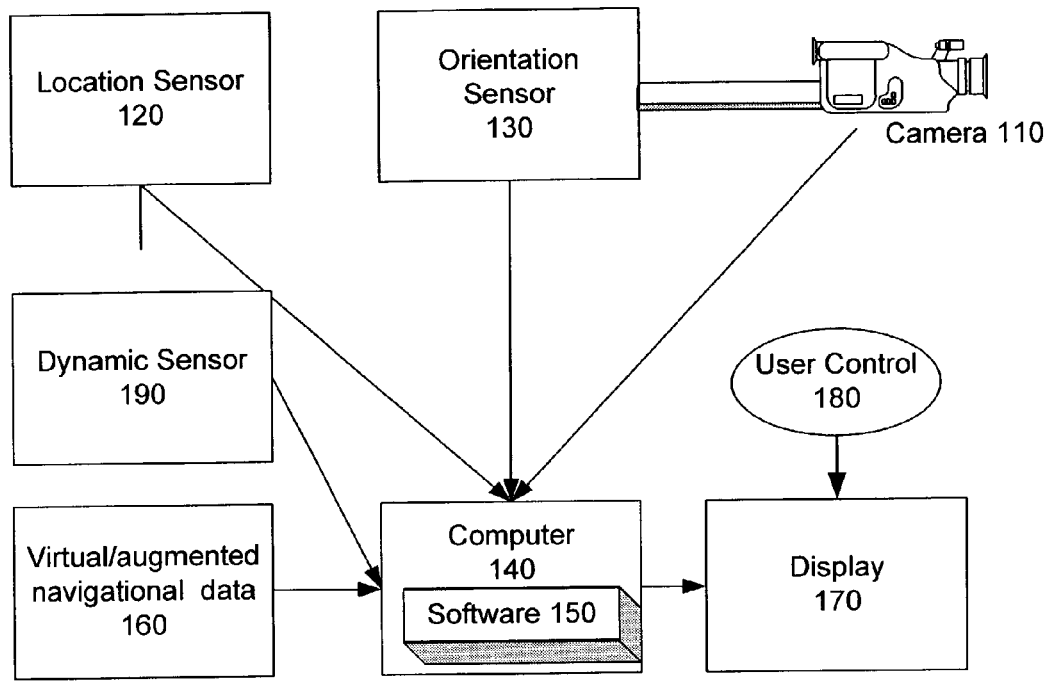
Fig. 1
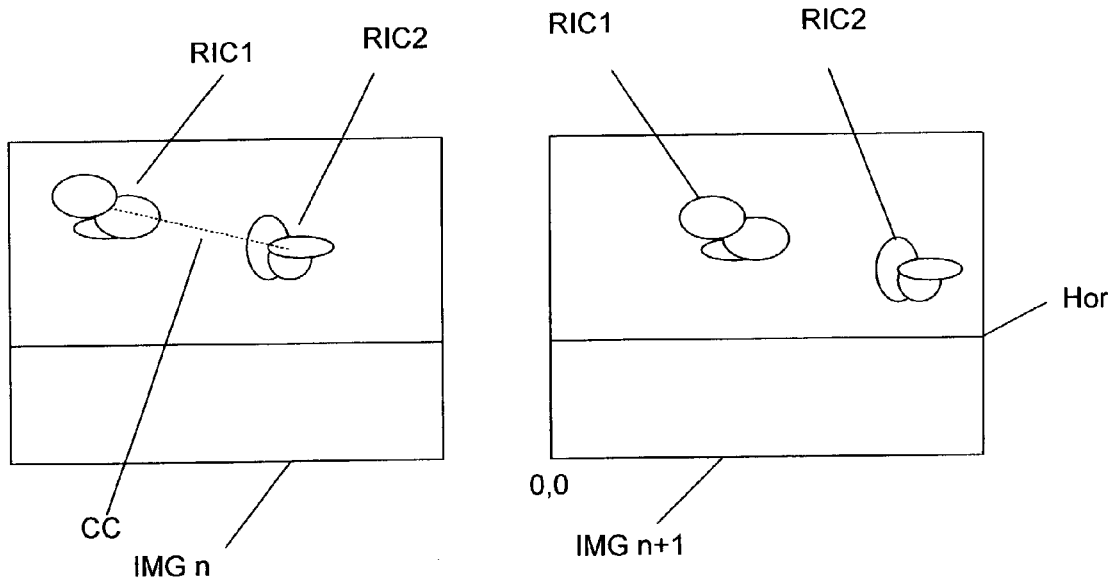
Fig. 3a  Fig. 3b

AUGMENTED REALITY NAVIGATION SYSTEM

RELATED APPLICATIONS

This application is a continuation in parts of U.S. patent application Ser. No. 10/385,119, filed Mar. 10, 2003 now U.S. Pat. No. 7,071,970, which is hereby incorporated by reference in its entirety.

FIELD OF THE INVENTION

The invention relates generally to computer modeled reality and more particularly to a system and method for augmented reality based navigation system.

BACKGROUND OF THE INVENTION

Augmented Reality (commonly referred to by the acronym AR) combines the "real world" reality view with a virtual view. The "real world" reality is the actual observable scene, one captured by a camera, or another optical or electronic sensor. The observable scene is determined by the camera location, direction of view and limitations of the actual environment (such as darkness, fog, smoke, and the like). In AR, computer generated images are combined with an actual or a representation of the observable scene. A computer renders additions to the environment based on an environment model that contains information required to render information of interest such as navigational aids and the like. Such rendition, generally referred to as overlay, may be a photo-realistic rendition of objects, a cartographical rendition, navigational data, and the like. In some cases, the most effective rendition comprises icons, textual data, pointers, and the like. Computerized environment models often comprise a combination of computer generated graphics with actual photographic data. Depending on the purpose of the system dynamic objects may be added through linking information provided by sensors like radar, sonar, magnetic, heat and other sensors that reflect a dynamically changing reality.

The viewpoint determines the viewable scene. The viewpoint is determined by the viewer coordinates, the direction of view, i.e. the x, y, and z coordinates and the heading (yaw), pitch and roll. The view itself is also determined by the horizontal and vertical field of view. A location sensor and an orientation sensor are provided to sense the direction of view, and allow the AR system to compute the viewpoint and to correlate the overlay with the observable scene in a process called registration. The overlay is merged with the observable scene image, in close registration thereto, to augment the visual information supplied to the user.

To increase clarity and brevity, these specifications will relate interchangeably to a combination of location and orientation as 'LOR', and to the combination of yaw, pitch, and roll as 'YPR'.

The view is generated by a viewer, which may be an actual user's viewing a scene (most commonly via a viewing device in a see through system), but may also be an image sensor such as a camera, an optical sensor such as a periscope, fiber optic viewing device, and the like. In these specifications the viewer is generally used to denote a source from which the observable scene is inputted into the system. At a given point in time, the viewer has a viewpoint, which determine the observable scene.

An example of augmented reality system is presented in U.S. Pat. No. 6,208,933 to Lazar, directed to overlaying cartographic data on sensor based video. In this system cartographic data from a storage device is superimposed on data received from a video sensor. A location sensor is utilized to correlate the video image and the cartographic image.

AR systems are extremely beneficial for navigational purposes. A good example of navigational AR system may be found in U.S. Pat. No. 6,181,302 to Lynde, which discloses a marine navigation binoculars with virtual display superimposing real world image. The Lynde device uses orientation and positioning sensors, and overlays navigational and other data from several sources on the real world image. However a common disadvantage of these systems is the reliance on complex, heavy, and expensive location and orientation sensors.

Many LOR sensors exist that provide location and orientation parameters. The most common ones for location are based on GPS or inertial navigation technologies. For orientation, magnetic and gyroscopic, as well as light based systems are widely used.

It should be noted that most often the speed of location change tend to be far slower than the speed of YPR change. Moreover, for many practical applications the rate of location change is sufficiently small to permit the use of an inexpensive location sensor as the only means for location information. However changes in YPR are far faster, and thus require fast resolution. This is especially the case when the system is used to provide visual information such as in a marine or aerial navigation system, where the user perception is severely hampered by registration errors with the environment.

The existing YPR sensors suffer from compromises: Fast and accurate sensors (e.g. ring laser gyro based sensors) are prohibitively expensive for many applications. While inexpensive sensors generally provide orientation solution with sufficient accuracy, they require a long time to stabilize and thus are unsuitable for many applications that involve rapid motion in one or more axis. Marine and aviation navigation applications are especially vulnerable to the slow resolution time of those inexpensive sensors.

Examples of AR systems using different sensors may be seen in U.S. Pat. No. 4,802,757 to Pleitner et al., U.S. Pat. No. 6,453,223 to Kelly et al. and in US published application 2002/0069013 to Navab et al. U.S. Pat. No. 4,672, 562, U.S. Pat. No. 6,285,930 to Dickson et al. U.S. Pat. No. 4,866,626 and others.

Known solutions suffer the disadvantage of requiring training or placing objects in the environment, are slow, or are prohibitively expensive. If for example one of the uses of the system is entering into an environment for the first time, such as by a ship entering a new port, or an airplane flying over new terrain, or a combat team entering a hostile environment, the solutions provided are impractical. There is therefore a clear and unanswered need for a navigation system that will provide fast and efficient AR with good registration, and at reasonably low cost. The present invention aim at providing an apparatus and a method for answering this need.

SUMMARY OF THE INVENTION

In U.S. patent application Ser. No. 10/385,119 from which the present application claims priority, the present owner and inventor described an affordable and accurate YPR sensing by combining an inexpensive YPR sensor while augmenting and enhancing the capabilities of such sensor using video processing techniques. The present invention utilizes this YPR sensor in a navigational AR system.

In a preferred embodiment of the present invention, the invention comprises a camera mounted on board a navigable vehicle such as a ship. The camera is used to capture images of the viewable scene dictated by its LOR. A computer is operable to generate a representation of a computerized environment model or a portion thereof, and a display to display a representation and the captured camera image, in registration. An inexpensive, and therefore relatively slow, YPR sensor (referred to hereinafter as base sensor, or a base location sensor) is used to obtain an initial YPR solution for the camera. A first image frame is obtained by the camera and analyzed to select certain features from the video data. Those features or regions in the image become Reference Image Components or RICs. Subsequent frames are taken and compared either to the first image or to any one of the preceding images, intervening between the first and current image. The RICS are again identified, and the relative displacement between the images is used to compute the new orientation. Methods for computing the orientation from the relative displacement are well known in the art, and some have been referred to in the background description above.

Periodically, the input of the base sensor is used to establish a new datum (i.e. YPR solution), from which another initial image is taken, and the process repeats as required. By the establishment of the new datum the invention overcomes the drift problem inherent with a delta-based system.

In the marine environment embodiment of the invention, the horizon, clouds, and wave orientation each separately, or in combination, provide an optional RIC.

The invention further extends to a method of aiding navigation comprising the steps of sensing a first set of orientation information from a base orientation sensor; capturing a video comprising a plurality of images of an observable scene, from ship mounted camera at a known orientation to the base sensor; identifying at least two RIC's in a first image from the video; computing a displacement of the RIC's between the first image and a subsequent image from the video; updating current camera orientation information utilizing said displacement; generating an overlay utilizing the current orientation to select objects or object representation to be placed in said overlay; and displaying said video and overlay in close registration on a display.

BRIEF DESCRIPTION OF THE DRAWINGS

FIG. 1 represents a simplified block diagram of a navigational system in accordance with the preferred embodiment.

FIG. 3 represents a sample of two captured image frame

DETAILED DESCRIPTION OF THE INVENTION

Figure 2:
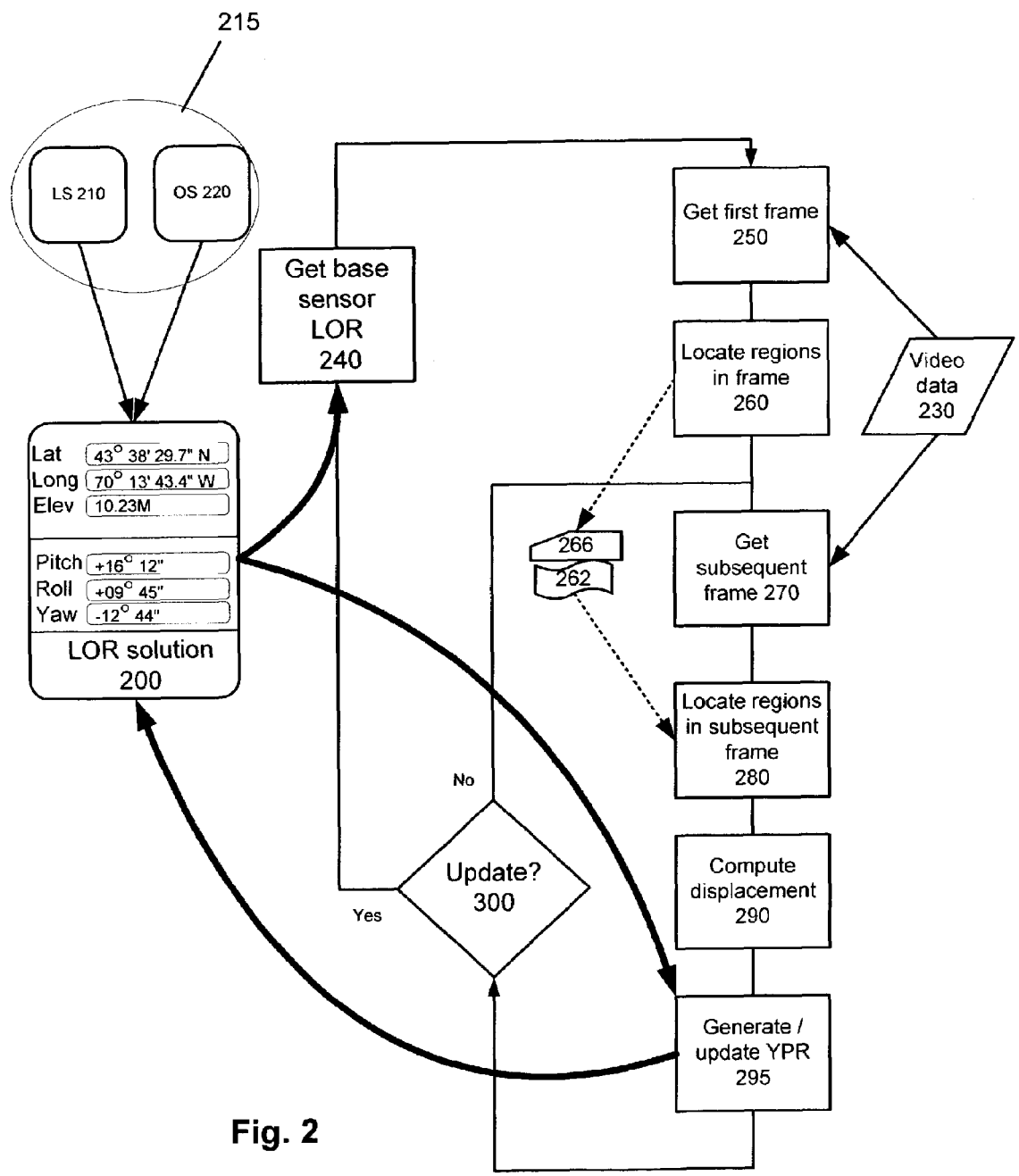
FIG. 2 represents a simplified flow diagram of the method in accordance with the preferred embodiment.

FIG. 1 depicts a general outline of a virtual or augmented reality system utilizing the preferred embodiment of the invention. A location sensor 120 is coupled to a computer 140, to provide periodic location information. A camera 110 is mounted on the ship, and thus directly or indirectly is coupled to an orientation sensor 130. The computer 140 is adapted to execute software 150 that amongst other things can perform the general block diagram of FIG. 2. In addition, in the preferred embodiment, the computer is coupled to a virtual reality and/or augmented reality data 160. Utilizing the LOR information, the computer can present the virtual/augmented reality on the display 170.

FIG. 2 shows an example of process flow of the preferred embodiment of the invention. Initial LOR data is collected from location sensor 210 and orientation sensor 220 in 240. The collected data becomes the current LOR solution 200. At the same time, or at sufficiently close temporal proximity, a 'first frame' is captured 250 from the camera video stream. preferably the frame being taken at the time the LOR data (or at least the YPR data portion of the LOR) is valid becomes the 'first frame'.

The software then analyzes the frame data and identifies 260 at least two regions 262 and 266 in the image (RICs). The RICs may be identified by any convenient method, such as color, edges, heat signature, and the like. While there is a certain risk of identifying a moving object, this risk can be minimized by using certain heuristic assumptions and by increasing the number of RIC identified. For many applications, even the use of a moving object for a RIC does not present a major problem. If the object movement is slow relative to the rate of frames analyzed, and the rate of updates from the sensors, then the error will likely be negligible. In the marine environment a horizon provides a good single reference, and even wave direction and periods, especially when analyzed relative to the hull with a known heading, may be used as a RIC. However the system is not limited to such items and any convenient recognizable object may be selected.

When a subsequent frame is captured 270 and analyzed, RICs 262 and 266 are identified in it 280. If sufficient number of the RICs can't be identified, a new YPR fix is required from the base sensor. Otherwise, a displacement is calculated between the first and subsequent frames 290. The differences in orientation of the regions allow such calculation to determine the displacement between in which the first frame was taken, versus the current frame. The displacement and the YPR of the previous frame are used to calculate a new current YPR 295. The current LOR 200 is than updated.

It should be noted that the process works both on comparison between the 'first' frame and the present frame, or between the present frame and any antecedent frame. In the preferred embodiment, the consecutive frames are compared to each other.

FIGS. 4a and 4b represent a simplified example of displacement calculation. Clearly identified images, such as clouds in the example, are used as RICs. Identifying objects in an image is, as mentioned above, a well known process, and may utilize shape recognition, edge recognition, and other characteristics observed from the image. By way of non-limiting example, the image itself is 90° wide by 60° tall. The image is also 300 pixels wide by 200 pixels tall. Thus, each pixel represents 0.3° in width, and 0.3° in height.

In this example, it is assumed there is no change in roll. Thus for example, in the first frame RIC1 is at 50,180 and RIC2 is at 180, 150. In the second frame RIC1 is at 150,160 and RIC2 is at 280, 130. In both cases the change in coordinates (x, y delta) is +100,−20. Using the known translation of pixels to angle, the pixel displacement translates into a yaw change of (0.3°×100)=30° and a pitch change of (0.3°×−20) =−6.0°. Heading information may be added to the equation if applicable.

If roll is introduced, then the following additional steps are performed. It is assumed that the roll axis is the center of the screen, and software can rotate the image about this axis. Using the last known roll value, the first image is rotated so that it represents the image with zero degrees of roll. Then the second image is rotated a similar amount. Next, roll is determined by comparing the angular difference of a line drawn between the RIC pair of the first frame CC, and a similar line derived from the RIC pair of the second frame. If the lines angle match, then no roll has occurred between frames. If they do not match, then the second image is rotated to zero degrees of roll prior to calculating pitch and yaw.

Several hardware solutions for calculating displacement in terms of region within a set of images are available. Most prominently, as the MPEG (Motion Pictures Engineering Group) standard discuss motion vectors at length, several attempts have been made to perform such motion vector calculation by hardware, or a specialized application of hardware and software, to provide efficient MPEG encoding. It will be clear to those skilled in the art that such specialized hardware or hardware/software combination is equivalent to the described and claimed software operations and that the invention contemplates and extends to such methods and hardware. Thus aspects of the invention further include the usage of MPEG hardware such as decoders and encoders, and the use of motion vectors algorithms of all kinds, such as vector quantization, etc., weather executed by image processing circuitry, or by a computer.

Dead reckoning or other methods such as ranging or measurements of change in size, or various combinations of well-known methods may be utilized to obtain location compensation if desired.

The current YPR solution is then used by the AR system. Knowing the LOR, and the camera field of view defines a computerized viewport on the environment. The model data 160 is searched and objects within the viewport are selected for display. Other selection criteria may apply, but in the preferred embodiment all objects are selected and a mode selected by the user is then used for further selecting which items are added to the overlay. Preferably a selector 180 is provided for the user, operating by a simple menu system, or by predetermined user interface, to allow easy selection of the displayed objects.

The overlay is then merged with the video stream captured by the camera and the combined video is displayed on display 170. The fast YPR solution that is derived from the sensed scene offer tight registration and correlation between the observable scene and viewport, and thus the generation of accurate overlay tightly coupled to the viewed scene.

Figure 4:
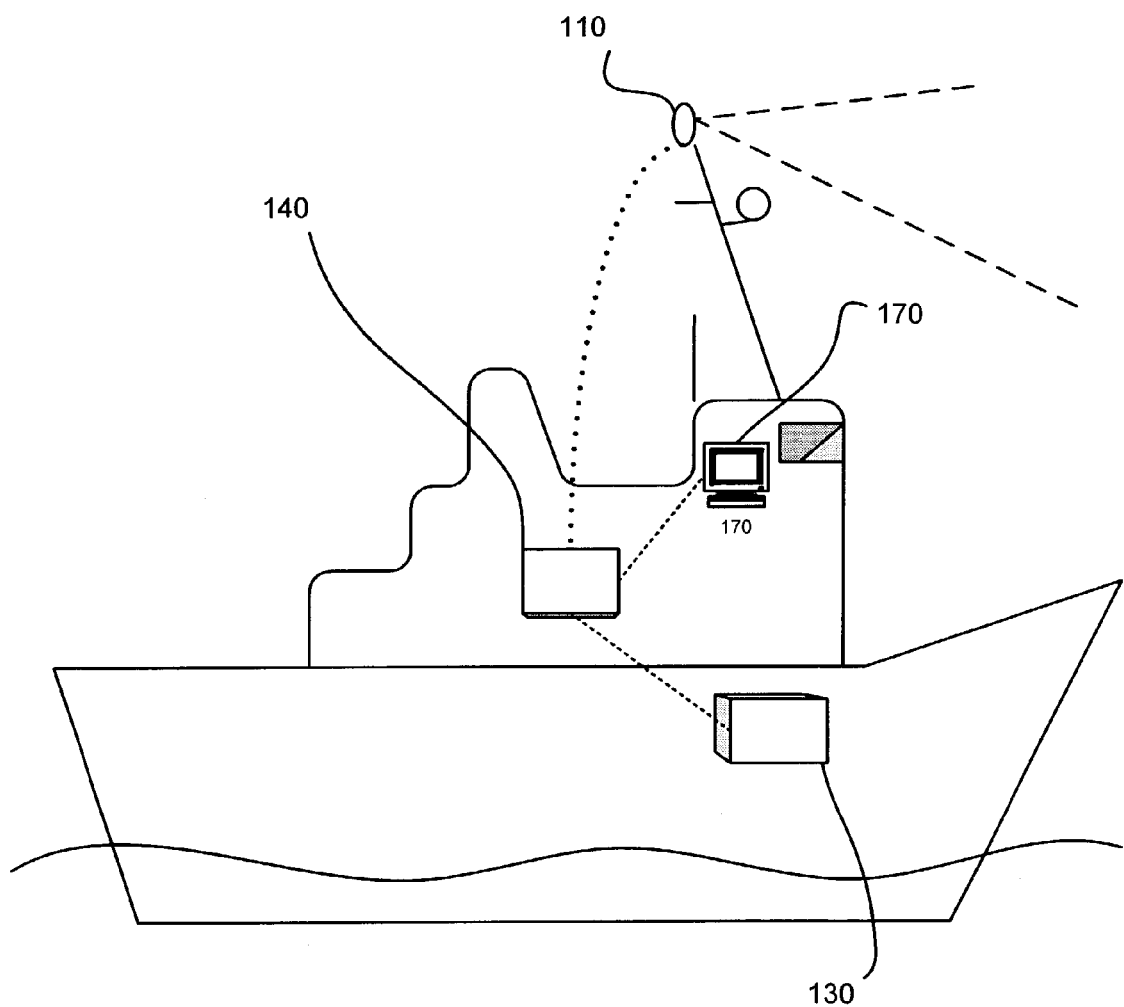
FIG. 4 represents a simplified block diagram of a shipboard navigational system

FIG. 4 represents a simplified diagram of preferred location of major system component, where the camera 110 is preferably mounted at the masthead or close thereto. The computer 140 may be located at any desired location aboard the ship, while the display 170 is located in a location convenient for people to use. More than one display may be utilized, such as for example in a combat information center and on the bridge.

Optionally, data from dynamic sensors, (e.g. radar, sonar, thermal sensors, magnetic anomaly sensor, manual entry, or data communicated from other ship, aerial, or shore based stations) may also be added to the data available for the computer, and thus dynamically expand the environment model. Such data is preferably displayed in accordance with the mode selected by the user.

In certain applications it is desirable to utilize a camera sensitive to infrared or ultraviolet, or other characteristics of sensing the adjacent environment. Therefore it should be clear that term camera extends to such cameras that cover the visible as well as those that cover the invisible spectrum.

Even if the camera orientation relative to the ship is variable, the derivation of the camera orientation from the combination of the sensed ship orientation and the camera orientation relative to the ship is clear to those skilled in the art. Also a matter of technical choice is parameters such as camera resolution, capturing and processing speeds, and the like, as the system provides for an accurate resolution from the base sensor, and the invention may be utilized only to provide sufficient compensation for the specific application, between successive valid base sensor resolutions.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

the invention claimed is:

1. An augmented reality navigation system coupled to a navigable vehicle, having a camera adapted to capture a plurality of image frames of an observable scene in accordance with said camera orientation, a display, and a base orientation sensor, the system further comprises:
   a computer operable to:
      obtain an initial orientation from a said base orientation sensor;
      analyze a first image captured from said camera, and select a plurality of reference image components (RIC's) therein;
      identify said RIC's in a subsequently captured image and calculate a displacement for said RIC's between frames;
      compute a current orientation from said initial orientation and displacement, or a recently obtained orientation and said displacement;
      generate an overlay comprising representation of objects, at least some of said objects selected using said current orientation;
      periodically update said current orientation, using information received from said base sensor, received after at least one of said computations of current orientation using said displacement; and,
   wherein said display is adapted to display said scene observable by said camera, and said overlay in registration.

2. An augmented reality navigation system as claimed in claim 1, wherein said camera is movably mounted to said navigable vehicle.

3. An augmented reality navigation system as claimed in claim 1, wherein at least one of said RIC's comprises a portion of the horizon.

4. An augmented reality navigation system as claimed in claim 1, wherein at least one of said RIC's comprises a relative direction of waves.

5. An augmented reality navigation system as claimed in claim 1, wherein at least one of said RIC's is a marine navigational aid.

6. An augmented reality navigation system as in claim 1 wherein said analysis utilizes wave periods.

7. An augmented reality navigation system as claimed in claim 1, wherein said camera is coupled to a maritime vessel.

8. An augmented reality navigation system as claimed in claim 1, wherein said camera is coupled to a periscope, and deriving said orientation therefrom.

9. An augmented reality navigation system as claimed in claim 1, further comprising a selector control for selecting objects to be included in said overlay.

10. A method for marine navigation comprising the steps of:
   sensing a first set of orientation information from a base orientation sensor;

capturing a video comprising a plurality of images of an observable scene, from ship mounted camera at a known orientation to said base sensor;

identifying at least two reference image components (RIC's) in a first image from said video;

computing a displacement of said reference image components between said first image and a subsequent image from said video;

updating current camera orientation information utilizing said displacement;

receiving a subsequent set of orientation information from said sensor, and utilizing said subsequent set of orientation information to current or replace said current orientation parameters after it was updated at least once by said step of updating;

generating an overlay utilizing said current orientation to select objects or object representation to be placed in said overlay; and, displaying said video and overlay in close registration on a display.

11. A method for marine navigation as claimed in claim 10, wherein said camera is movably mounted to said ship.

12. A method for marine navigation as claimed in claim 10, wherein at least one of said RIC's comprises a portion of the horizon.

13. A method for marine navigation as claimed in claim 10, wherein at least one of said RIC's comprises a relative direction of waves.

14. A method for marine navigation as claimed in claim 10, wherein at least one of said RIC's is a marine navigational aid.

15. A method for marine navigation as claimed in claim 10, wherein said said step of computing utilizes wave periods.

16. A method for marine navigation as claimed in claim 10, wherein said camera is coupled to a periscope, and deriving said orientation therefrom.

17. A method for marine navigation as claimed in claim 10, further comprising the step of selecting features or objects to be included in the displayed overlay.

18. An augmented reality navigation system coupled to a navigable vehicle, having a camera adapted to capture a plurality of image frames of an observable scene in accordance with said camera orientation, a display, and a base orientation sensor, the system further comprises:

circuitry operable to:

analyze a first image captured from said camera, and select a plurality of reference image components (RIC's) therein;

identify said RIC's in a subsequently captured image and calculate a displacement for said RIC's between frames; and, a computer operable to:

obtain an initial orientation from a said base orientation sensor;

compute a current orientation from said initial orientation and displacement, or a recently obtained orientation and said displacement;

generate an overlay comprising representation of objects, at least some of said objects selected using said current orientation;

periodically update said current orientation using information received from said base sensor, received after at least one of said computations of current orientation using said displacement; and, wherein said display is adapted to display said scene observable by said camera and said overlay in registration.

19. An augmented reality navigation system as claimed in claim 18, wherein said circuitry utilize MPEG encoding.

20. An augmented reality navigation system as claimed in claim 18, wherein said circuitry utilizes vector quantization technique.

* * * * *